United States Patent [19]

Usuda

[11] Patent Number: 5,455,906
[45] Date of Patent: Oct. 3, 1995

[54] ELECTRONIC BOARD SYSTEM

[75] Inventor: Yutaka Usuda, Yokohama, Japan

[73] Assignee: Hitachi Software Engineering Co., Ltd., Kanagawa, Japan

[21] Appl. No.: 69,370

[22] Filed: Jun. 1, 1993

[30] Foreign Application Priority Data

May 29, 1992 [JP] Japan .................................. 4-139141

[51] Int. Cl.$^6$ .................................................. G06F 15/00
[52] U.S. Cl. ........................................................ 395/162
[58] Field of Search ........................... 395/162; 345/173, 345/179

[56] References Cited

U.S. PATENT DOCUMENTS

| | | | |
|---|---|---|---|
| 5,027,198 | 6/1991 | Yoshioka | 358/85 |
| 5,134,388 | 7/1992 | Murakami | 340/706 |
| 5,181,129 | 1/1993 | Sato et al. | 358/494 |
| 5,274,362 | 12/1993 | Potvin | 345/178 |

FOREIGN PATENT DOCUMENTS

| | | |
|---|---|---|
| 368779 | 5/1990 | European Pat. Off. . |
| 379336 | 7/1990 | European Pat. Off. . |
| 62-52630 | 3/1987 | Japan . |
| 2-200499 | 8/1990 | Japan . |
| 3-26855 | 4/1991 | Japan . |

OTHER PUBLICATIONS

Patent Abstracts of Japan, JP-A-63279651, vol. 13, No. 109, Mar. 15, 1989.
Patent Abstracts of Japan, JP-A-2206826, vol. 14, No. 500, Oct. 31, 1990.

Primary Examiner—Raymond J. Bayerl
Assistant Examiner—U. Chauhan
Attorney, Agent, or Firm—Fay, Sharpe, Beall, Fagan, Minnich & McKee

[57] ABSTRACT

An electronic board system has a reduced display region at a lower portion of a writing screen on its electronic board, in addition to a non-reduced display region. A character, an image such as a graphic, etc., and an edit command, written on the reduced display region, can be entered into the electronic board system, and can be displayed on the non-reduced display region of the writing screen of the electronic board. Hence, the image displayed on the non-reduced display region can be seen by other persons in front of the electron board without interference from a shadow of the writer, and the electronic board can be manipulated with readiness and at high precision by a person who cannot reach an upper portion of its writing screen. Further, sensors capable of sensing the traces of the image are embedded in the rear of the writing screen so that the electronic board can readily be moved and can be prepared at reasonably low cost. The characters, images, edit commands, and so on written manually on the electronic board with a pointing device can be recognized and edited on the basis of the recognized command. The results of recognition are then projected onto and displayed on the writing screen of the electronic board.

4 Claims, 17 Drawing Sheets

OVERLAP-TYPE DISPLAY

TILE-TYPE DISPLAY

LOGICAL DATA

| LOGICAL DATA ID# | KIND | POSITION | DATA | ATTRIBUTE INFORMATION |
|---|---|---|---|---|
| 1 | CIRCLE | CENTRAL COORDINATE | LENGTH OF RADIUS | KIND OF LINES |
| 2 | LINE OF CHARACTERS | STARTING COORDINATE | "A B C" | FONT, LETTER SIZE |
| 3 | COMMAND | STARTING COORDINATE | DELETE | LOGICAL DATA ID# = 1 |

INPUT INFORMATION

DISPLAY INFORMATION

INPUT INFORMATION

DISPLAY INFORMATION

FIG. 11

| COMMAND | SYMBOL | MEANING |
|---|---|---|
| DELETE | × | DELETE PORTION WHERE SYMBOL "X" IS OVERWRITTEN |
| MOVE | o⌒↗ | MOVE TO TIP POSITION OF ARROW SYMBOL |
| COPY | o⌒↗ | COPY AT TIP POSITION OF ARROW SYMBOL |
| RETRIEVE | ◎n | RETRIEVE IMAGE DATA FROM n-TH IMAGE INPUT MEANS |

INPUT INFORMATION

DISPLAY INFORMATION

FIG. 17

INPUT DEVICE MANAGEMENT TABLE ~170

| DEVICE ID# | KIND | ADDRESS | STATUS | DISPLAY MODE | STARTING POSITION | ENDING POSITION |
|---|---|---|---|---|---|---|
| 1 | FAX | PC#01.001 | WAITING | — | — | — |
| 2 | ELECTRONIC BOARD | PC#01.002 | IN PROCESS | OVERLAP | (c, 0) | (a, d) |
| 3 | SCANNER | PC#02.001 | WAITING | — | — | — |
| 4 | VOICE INPUT | PC#03.001 | WAITING | — | — | — |
| 5 | ELECTRONIC BOARD | PC#03.002 | IN PROCESS | TILED | (0, 0) / (c, d) | (c, d) / (a, b) |
| 6 | TABLET | PC#03.003 | IN PROCESS | STANDARD | — | — |

NOTE : — : INVALID DATA

ELECTRONIC BOARD SYSTEM

BACKGROUND OF THE INVENTION

The present invention relates to an electronic board system adapted to recognize written characters as well as images, such as graphics and pictures, drawn on a screen of an electronic board, and to project the results of recognition onto the screen.

It is conventional in a meeting that the attendants discuss a preset issue on the basis of papers prepared in advance and/or information written or drawn on a blackboard or whiteboard on site, that they check the contents of the issue and amend them as needed, that the conclusion or interim results are recorded, and that a copy of the results of the meeting are distributed to the attendants and persons concerned.

Incidentally, throughout the specification, the terms written and drawn, in all forms, should be considered interchangeable with respect to the act of placing, or existence of, information such as characters, commands, images, graphics, pictures, etc. on a blackboard or whiteboard, whether electronic or not.

Electronic board systems are known as convenient means capable of facilitating a meeting. Such electronic board systems are disclosed, for example, in Japanese Patent Examined Publication (kokoku) No. 3-26855 and Japanese Patent Unexamined Publication (kokai) Nos. 2-200499, 1-125296, 63-209999, and 62-52630.

The electronic board system as disclosed in Japanese Patent Examined Publication (kokoku) No. 3-26855 is configured in such a manner that characters, graphics, etc. written or drawn on a screen of the electronic board system, with and through a writing device with an oscillator equipped therein, are detected as a sequence of data of coordinate positions through a sensor that is embedded in the electronic board. The sequence of the coordinate position data is stored in image memory, and the traces of the characters, graphics, etc. indicated by the sequence of the coordinate position data are displayed as the characters, graphics, etc. on a display screen. The sequence of the coordinate position data existing in a given region is deleted from the corresponding image memory, with and through a deleting device with an oscillator equipped therein, by performing operations for deleting the displayed coordinate position data from the given region on a screen of the electronic board, and the characters, graphics, etc. displayed in the given region are thereby deleted from the display screen.

The electronic board system as disclosed in Japanese Patent Unexamined Publication (kokai) No. 2-200499 is so arranged as to recognize characters, graphics, etc. written manually with a writing device on its board through a recognition processing device, and to record the result of recognition on recording paper.

Further, the electronic board system as disclosed in Japanese Patent Unexamined Publication (kokai) No. 63-209999 is configured in such a fashion that characters written manually are read through an image reader and recognized with an OCR, and the result of recognition is displayed on a screen of the electronic board in an enlarged manner.

In addition, the electronic board system as disclosed in Japanese Patent Unexamined Publication (kokai) No. 1-125296 is configured to recognize voices entered in a voice recognition device as letters, and to display the words corresponding to the recognized voices on the screen of the electronic board.

Furthermore, Japanese Patent Unexamined Publication (kokai) No. 62-52630 discloses an electronic board system which is configured to recognize characters and graphics entered manually on a transparent graphics tablet device through a stylus input device and to display the result of recognition on a display device, such as a liquid crystal screen, integral with the graphics tablet device.

In addition to those described hereinabove, a device is proposed in an article entitled "A New Face of User Interface: Features of Two Big OSs for Input through Pens" ("Nikkei Byte" Magazine, April, 1991, pages 233 to 238), which can translate particular traces of a pen on a graphics tablet device integral with a liquid crystal screen into edit commands, and edit the corresponding image displayed on the liquid crystal screen.

Furthermore, as introduced in the leaflet "Smart 2000 Series Products" of Smart Technology, Inc., Canada, a data processing system is proposed which allows the user to perform all operations in an interactive manner on a screen of the electronic board by recognizing characters, graphics, commands, etc. written through a pointing device on the screen of the electronic board, and projecting the result of recognition or the result of execution of the commands through an LCD projector on the screen thereof and displaying it in a real time basis thereon.

The electronic board systems described hereinabove, which are arranged to display the result of voice recognition or the result of recognition through the OCR on the screen of the electronic board, suffer from the disadvantage that, although characters or graphics can be corrected on the electronic board, the result of correction cannot be recorded.

On the other hand, the electronic board systems having the sensors embedded into the electronic board or having the function of recognition added can record the result of correction; however, the former requires the use of a special deleting device that is different from the pointing device so that it is laborious to distinguish the deleting device from the pointing device, or vice versa, whenever characters, graphics, etc. are to be deleted or written, and the latter requires the function of recognition on a large scale. Moreover, the weight of the electronic board system becomes so great that it is very inconvenient to move the electronic board system to another place.

Further, the device using the graphics tablet device with the liquid crystal screen is developed solely for use by an individual person. A display device utilizing the graphics tablet device with the sensors and so on embedded therein and the liquid crystal screen, which requires precision processing, should be made larger in size, however, and the graphics tablet device should be integrated with the liquid crystal screen. Thus, manufacture become expensive, quality may become unstable, and the electronic board system is difficult to move.

In addition, electronic board systems of the Smart 2000 series that project onto the screen of the electronic board the display contents of a personal computer, which is designed for an individual person to use while facing the display screen, suffer from the disadvantages that complex and precise operations cannot be performed because a portion which a person writing on the electronic board shadows cannot be seen by the writing person himself and other persons, and the size and resolution of the electronic board cannot be utilized to a sufficient extent because some persons cannot reach and executed MENU commands or display data items, which are located at an upper portion of the electronic board.

SUMMARY OF THE INVENTION

Therefore, the object of the present invention is to provide an electronic board system that can be readily moved, that does not require a pointing device distinguished from a deleting device, that can be operated in a complex and precise fashion even if a person using the electronic board system cannot reach the upper portion of the electronic board, and that can be prepared at low cost.

In order to achieve the above-mentioned object, the present invention consists of an electronic board system comprising:

a pointing device;

a plurality of sensors for detecting a trace of a character, a graphic, or the like, written on a writing screen with said pointing device, which are embedded in the back of the writing screen;

first storage means for storing the trace detected by said sensors as image data consisting of a sequence of coordinate data;

recognition means for recognizing the character, graphic, or the like written on the writing screen on the basis of the image data stored in said first storage means, and for recognizing whether the image data relating to a particular trace corresponds to any of a plurality of predetermined edit commands;

second storage means for storing the recognized character or graphic, the recognized edit command, and so on;

command execution means for editing the recognized character, graphic, or the like in accordance with the edit command stored in said second storage means; and projection and display means for projecting and displaying the edited character, graphic, or the like onto the writing screen of the electronic board, and for projecting and displaying the edited character, graphic, or the like in a reduced form at a lower portion of the writing screen of the electronic board;

wherein the character, graphic, or the like and the edit command to be represented in a reduced display region of the writing screen of the electronic board and in a non-reduced display region thereof can be recognized one after another; and wherein a display content to be displayed on the screen is updated one after another.

The arrangement of the electronic board system as described hereinabove allows the characters, graphics, edit commands, and so on written on the writing screen of the electronic board to be recognized by the recognition means, and the characters, graphics, and so on to be edited in accordance with the recognized edit commands. The edited characters, graphics and so on are further allowed to be projected and displayed on a non-reduced display region of the writing screen of the electronic board, and at the same time to be projected and displayed in a reduced form on a reduced display region located at the lower portion of the writing screen on the electronic board as well. Hence, even a person who fails to reach the upper portion of the screen on the electronic board can perform complex and precise operations in the reduced display region to thereby utilize the size and resolution of the electronic board to a sufficient extent. Further, the electronic board system according to the present invention having the configuration as described hereinabove can be operated at the non-reduced display region of the writing screen on the electronic board as well as at the reduced display region thereof; hence, if the operations are performed only at the reduced display region of the writing screen, the non-reduced display region thereof can be seen by other persons without causing the person handling the electronic board system to shadow the non-reduced display region of the writing screen on the electronic board.

Further, the sensors are embedded in the back of the writing screen of the electronic board so that the electronic board system itself can be moved or carried without difficulty and the electronic board system can be prepared at low cost.

In addition, such operations as deleting and so on can be executed in accordance with the edit commands so that no special deleting device is required, thereby improving operability.

BRIEF DESCRIPTION OF THE DRAWINGS

FIG. 11 is a table showing examples of edit commands.

FIG. 17 is a diagram showing an input device management table to be used when a plurality of image input means are connected.

DESCRIPTION OF THE PREFERRED EMBODIMENTS

Figure 1:
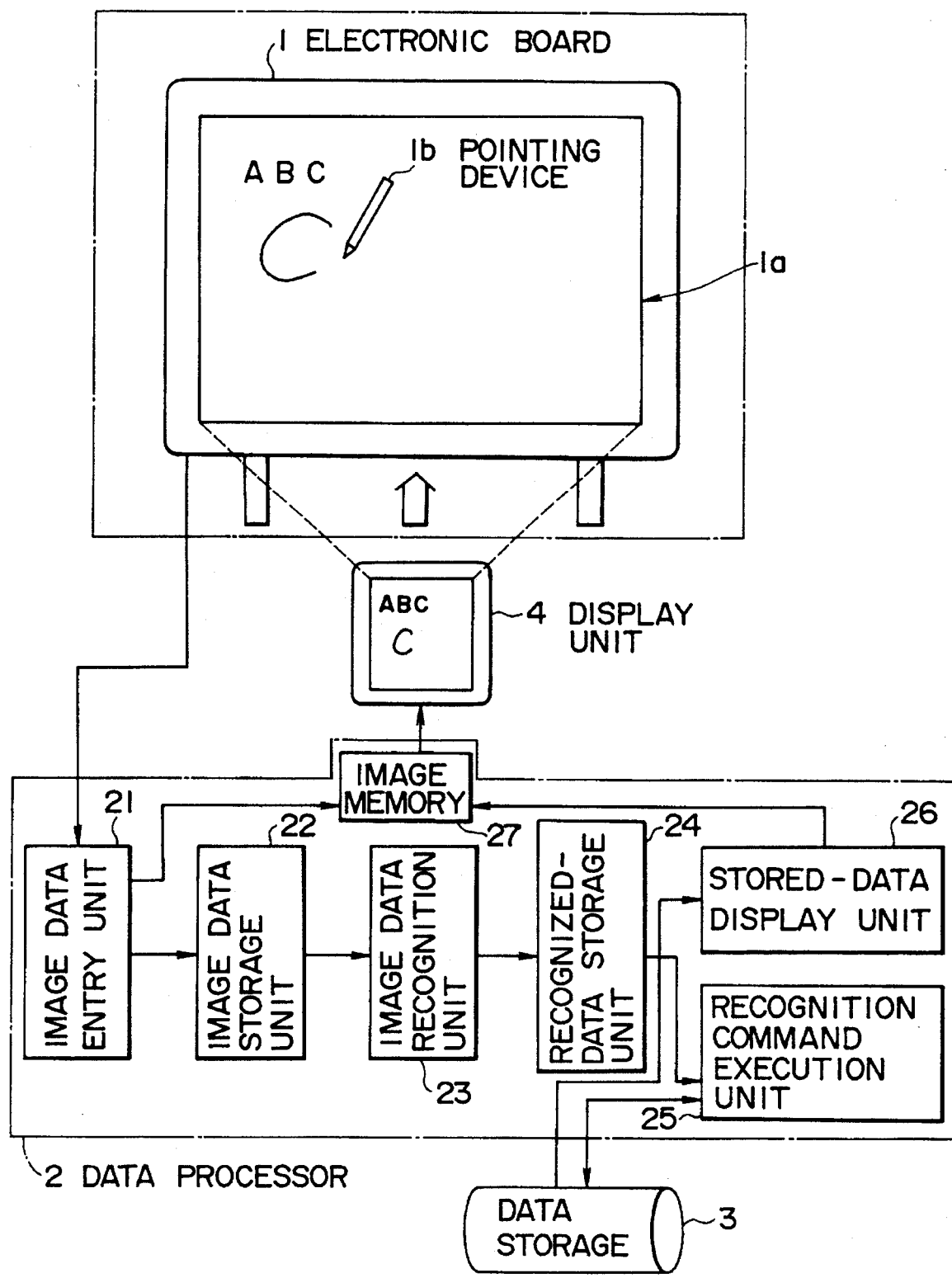
FIG. 1 is a block diagram showing a first embodiment of the electronic board system according to the present invention.

FIG. 1 is a block diagram showing a first embodiment of the electronic board system according to the present invention. The electronic board system comprises an electronic board 1, a data processor 2, a data storage 3, and a display unit 4.

The electronic board 1 has a writing screen 1a of such a structure that a large number of sensors are arranged and embedded in a matrix form in the rear of the writing screen 1a so as to detect traces of characters, graphics, or the like, which are written on the writing screen 1a with a pointing device 1b.

A different pointing device 1b may be prepared for each different color, or a switch may be provided for selecting one from the different colors, thereby making the pointing device 1b capable of transmitting signals having a different frequency of each of the different colors. On the other hand, the sensors are arranged so as to respond to the signals for each frequency to thereby distinguish the pointing device 1b for each color from the other pointing devices 1b, on the basis of the frequency transmitted from the pointing device 1b, and to thereby generate color data representing the color of the pointing device 1b that is being employed and coordinate data lines, indicative of the traces of the pointing device 1b, as image data.

Figure 2A:
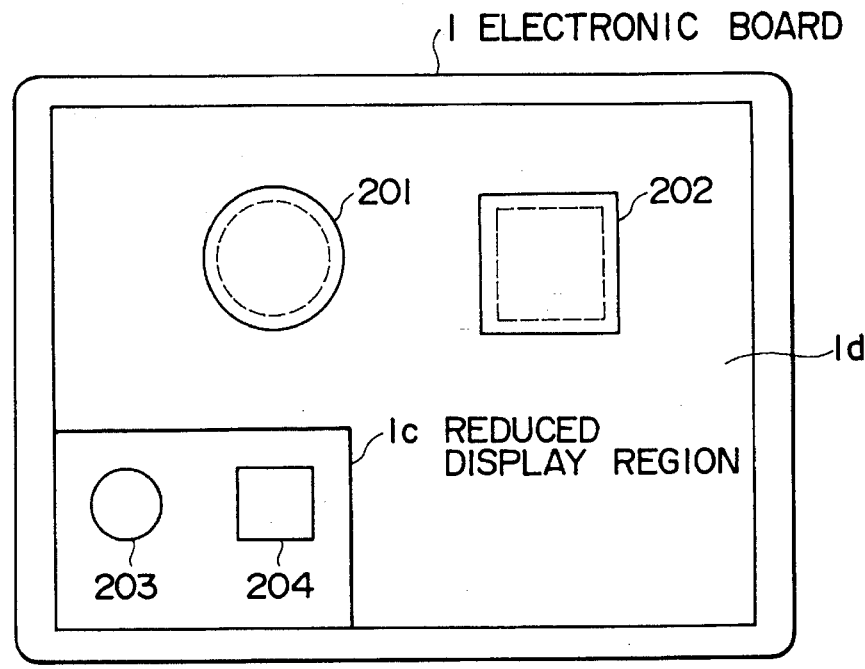
FIGS. 2(a) and 2(b) are each a schematic representation showing an example in which a non-reduced display region and a reduced display region are formed on the writing screen of an electronic board and graphics are displayed on both of the non-reduced display region thereof and the reduced display region thereof.
Figure 2B:
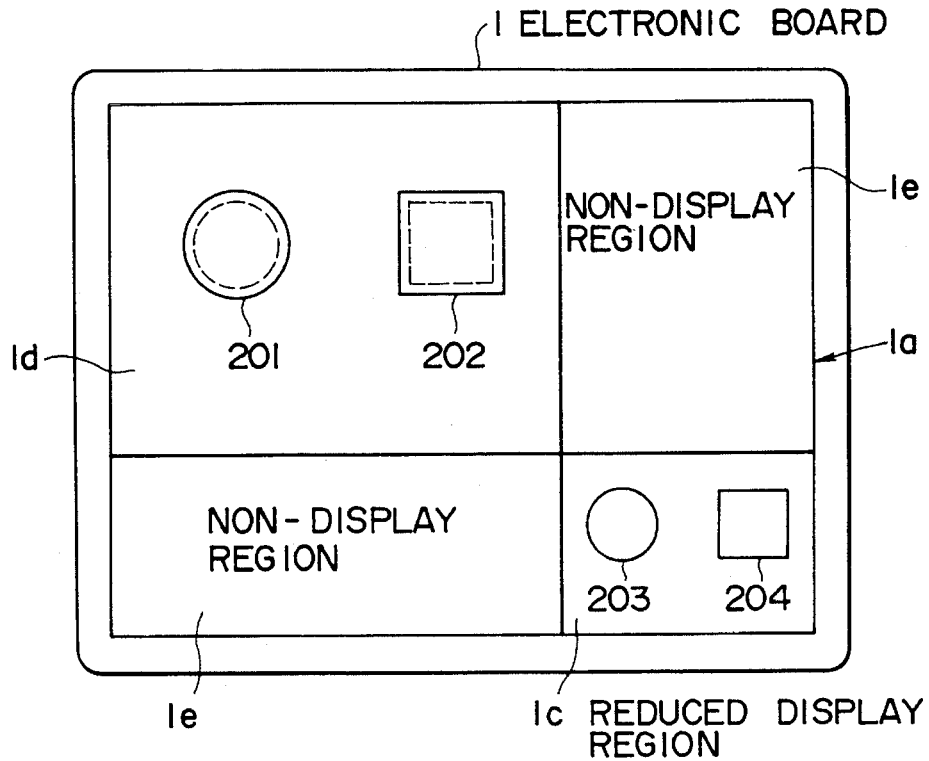

The writing screen 1a of the electronic board 1 may be of an overlap display type and of a tiled display type. The writing screen 1a of the overlap display type may be divided into a non-reduced display region 1d and a reduced display region 1c, as shown in FIG. 2(a). On the other hand, the screen 1a of the electronic board of the tiled display type may be divided as in a tiled form into a non-reduced display region 1d, a reduced display region 1c, and a non-display region 1e, for example, as shown in FIG. 2(b). The reduced display region 1c on the screen 1a of the electronic board 1 is provided with the sensors at a density higher than the other regions on the screen 1a thereof, thereby allowing the image to be displayed clearly without fading when the image entered in the reduced display region 1c is displayed in an enlarged form on the non-reduced display region 1d.

The data processor 2 comprises an image data entry unit 21 for entry of image data generated from the electronic board 1, an image data storage unit 22 for storing the image data entered into the image data entry unit 21, an image data recognition unit 23 for recognizing characters, graphics, and so on written on the screen 1a on the basis of the image data stored in the image data storage unit 22 and for recognizing the correspondence of the image data relating to a particular trace of the characters, graphics, or the like to either of a plurality of predetermined edit commands, a recognized-data storage unit 24 for storing the recognized characters, graphics, edit commands, and so on, a recognition command execution unit 25 for editing the recognized characters, graphics, and so on in accordance with the edit command stored in the recognized-data storage unit 24, and a stored-data display unit 26 for supplying the display unit 4 through an image memory 27 with the edited characters, graphics, and so on, projecting and displaying them onto the non-reduced display region of the writing screen 1a of the electronic board 1 by the display unit 4, and projecting and displaying them in a reduced form onto the reduced display region located at a lower portion of the screen 1a. With the arrangement as described hereinabove, the data processor 2 is so configured as to recognize the characters, graphics, edit commands, and so on, to be written both in the reduced display region 1c of the writing screen 1a and in the non-reduced display region 1d thereof one after another to thereby update the display contents on the screen 1a thereof.

The image data storage unit 22 comprises two storage unit sections, one of which can bring image data into a readable state and the other of which is allowed to be brought into a writable state. While the image data is continuously written in the storage unit section in the writable state from the electronic board 1, the image data written in the previous input cycle is read from the other storage unit section in the readable state to thereby enter the image data into the image data recognition unit 23. As the reading has been terminated, the storage unit section in the readable state is switched to the writable state and the other storage unit section in the writable state is switched to the readable state, thereby allowing the image data such as the characters, graphics, and so on, written in a manner asynchronous with processing for recognizing image data, to be supplied to the image data recognition unit 23 without losing them, by entering new image data from the electronic board 1.

The recognized-data storage unit 24 has likewise two storage unit sections, one of which is allowed to be brought into a readable state and the other of which is allowed to be brought into a writable state. While the results of recognition of the image data are continuously written into the storage unit section that is in the writable state, the recognized results of recognition are read in a previous recognition cycle from the other storage unit section in the readable state and entered into the recognition command execution unit 25. As the reading has been terminated, the states of the two storage unit sections are shifted, thereby switching the readable status of the storage unit section to the writable state and the previously writable status of the other storage unit section to the readable state. Consequently, new results of recognition can be written in the newly writable storage unit section to thereby provide the recognition command execution unit 25 with the results of recognition without losing them.

The recognition command execution unit 25 can read the result of recognition in the recognized-data storage unit 24 in the readable state in synchronization with a cycle of recognition by the image data recognition unit 23, edit the result of recognition, such as the characters, graphics, and so on, in accordance with the edit command, when the edit command was detected in the read results of recognition, and store the edited newest image data in the data storage 3. On the other hand, if no edit command was detected in the read results of recognition, the read results of recognition such as the characters, graphics, and so on are stored intact in the data storage 3. Hence, the data storage 3 always stores the data corresponding to the newest image projected and displayed on the screen of the electronic board 1 so that the data stored in the data storage 3 can be printed out with a printer when it is to be recorded on paper or the like.

The stored-data display unit 26 is arranged to read the edited image data stored in the data storage 3 and to display it on the screen of the electronic board 1 through the display unit 4. The procedures of display on the electronic board 1 in this case are not particularly restricted, and may involve projecting images onto a liquid crystal display unit through an overhead projector, projecting them through a projector, projecting them onto an opaque electronic board from the same direction in which the writer is present, or projecting them onto a transparent electronic board from the direction opposite to the direction in which the writer is present.

The recognition processing to be performed by the image data recognition unit 23 is performed in accordance with conventional techniques so that a detailed description of the recognition processing will be omitted from the explanation that follows.

Figure 3:
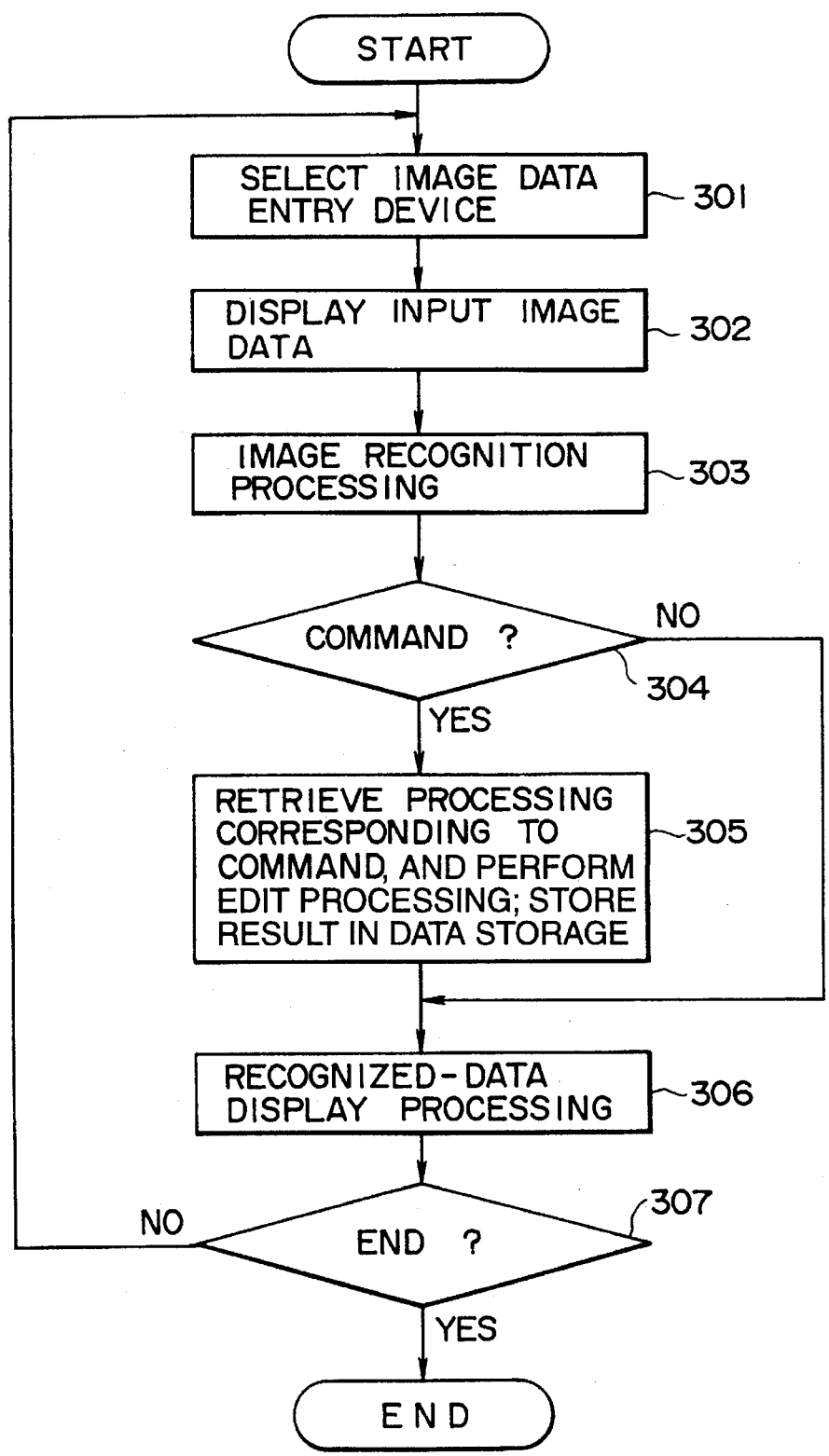
FIG. 3 is a flowchart showing procedures to be performed by a data processor.

FIG. 3 is a flowchart showing the procedures to be performed by the data processor 2.

First, at step 301, an image data device is selected for reading image data and entering it. The image device may be so arranged as to read the image data through an image reading means, such as a scanner or a facsimile machine, in such a manner as will be described hereinafter. In the first embodiment, the electronic board 1 is selected.

Then, at step 302, the image data is entered through the image data entry unit 21, which is composed of a coordinate data line representing the traces of characters, graphics, or the like, written on the writing screen 1a of the electronic board 1, and color data representing the color of the traces of the characters, graphics, or the like. Then, the image data is transferred directly to the display unit 4 through the image memory 27 and displayed on the screen 1a of the electronic board 1 prior to the execution of the recognition processing, while the image data is being stored one after another in the image data storage unit 22.

Further, at step 303, the image data stored n the image data storage unit 22 is read one after another and supplied to the image data recognition unit 23 to thereby recognize the characters, graphics, edit commands, and so on.

Figures 4, 5:
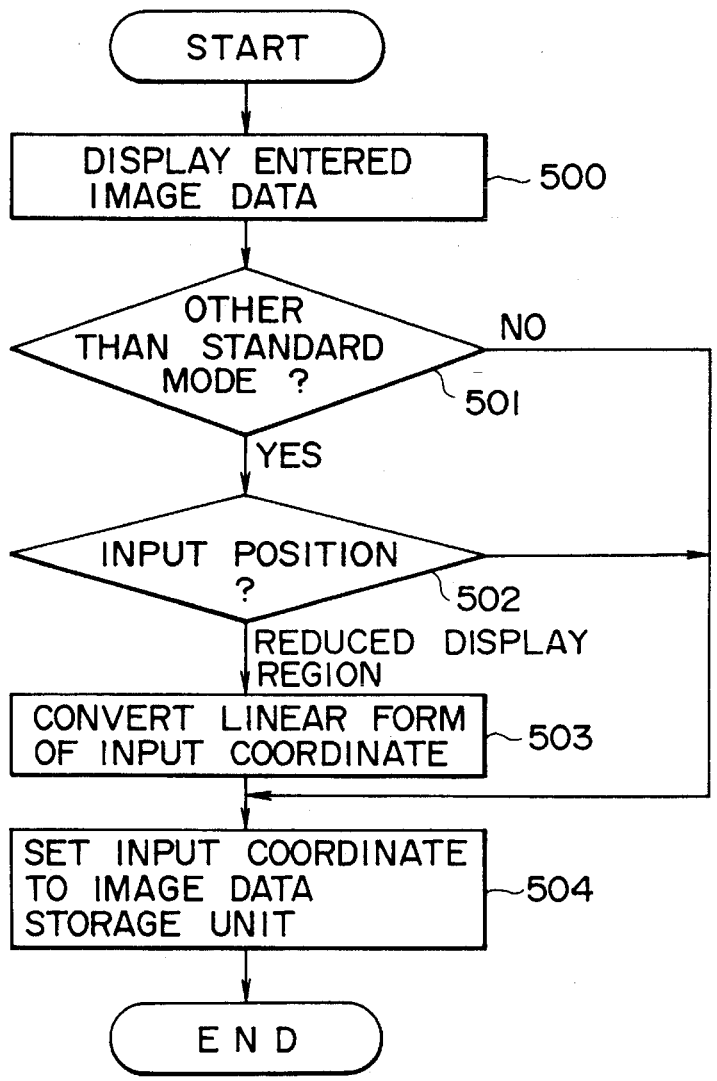
FIG. 4 is a table showing logical data of results of recognition of image data.
FIG. 5 is a flowchart showing details of a procedure for processing a display of input image data.

The results of recognition obtained by the image data storage unit 22 are then stored in the recognized-data storage unit 24. More specifically, the results of recognition may be stored in the table, as shown in FIG. 4, showing the logical data of the results of recognition of the image data. The results of recognition are provided in units of character, graphics, and so on with identification numbers as the logical data, and further classified by kind such as circle, line of character, command, and so on; by written position such as central coordinate; by data such as length of radius of a circle, character, and so on; and by attribute information such as kind of line of the circle, kind of font, letter size, and so on. It can be noted herein that the attribute information on the DELETE command is represented by logical data ID#= 1, as shown in FIG. 4, so that the DELETE command is intended to mean the command for deleting the image of the circle having the ID #1.

Hence, at step 304, the logical data stored in the recognized-data storage unit 24 is read by the recognition command execution unit 25 to thereby determine whether the read logical data contains the edit command. If the determination indicates that the command is contained in the logical data, then the program flow goes to step 305 at which the processing corresponding to the command is called to thereby edit the logical data such as the characters, graphics, and so on, and to store the results of recognition in the data storage 3. On the other hand, if it is decided that no command is contained in the read logical data, the logical data read from the recognized-data storage unit 24 is stored intact in the data storage 3.

Then, at step 306, edited image data stored in the data storage 3 is read by the stored-data display unit 26 and supplied to the image memory 27. Although at this time the image memory 27 still stores unprocessed image data that has been entered through the image data entry unit 21, the contents of the image memory 27 are overwritten with the edited image data, that is, the image data prepared by converting the manually written characters, graphics, and so on into block letters or into normal forms. Then, the image data is displayed on the screen of the electronic board 1 thorough the display unit 4.

It is then determined whether the display processing is completed. When the result of the determination indicates that the display processing is over, then the process has been terminated. On the other hand, when it is determined that the display processing is not over yet, then the program flow returns to step 301 and the processes are repeated at step 307 until an instruction to terminate the process is issued.

More specifically, for example, when the pointing device 1b is operated so as to write a circle 201 and a square 202 in broken lines on the non-reduced display region 1d of the writing screen of the electronic board (as indicated in the display system of the overlap display type as shown in FIG. 2(a), the circle 201 and the square 202 written in solid lines are projected and displayed in the same positions and in the same sizes as those written in broken lines. At the same time, a circle 203 and a square 204, each having the same shape as those displayed on the non-reduced display region 1d but having a reduced size, are projected and displayed on the reduced display region 1c located at the lower portion of the screen 1a of the electronic board 1.

The characters, graphics, and so on can be written through the pointing device 1b on either of the reduced display region 1c or the non-reduced display region 1d of the screen 1a of the electronic board 1. When they are written on the non-reduced display region 1d, they are written in their reduced sizes and shapes on the reduced display region 1c in the manner as described hereinabove. On the other hand, the characters, graphics, and so on written on the reduced display region 1c cannot further be reduced and displayed on the reduced display region 1c of the electronic board 1 as shown in FIG. 2(a); however, they can be displayed on the non-reduced display region 1d by transferring their coordinates to the non-reduced display region 1d.

Like the screen of the overlap display type as shown in FIG. 2(a), the characters, graphics, and so on can be displayed in both of the non-reduced sizes and shapes as well as the reduced sizes and shapes on the so-called tiled screen as shown in FIG. 2(b). The non-display region 1e in the screen 1a of the electronic board 1 as shown in FIG. 2(b), however, is so arranged as not to display any information of the characters, graphics, and so on.

FIG. 5 is a flowchart showing details of the procedures of the image data display processing at step 302 as shown in FIG. 3. First, at step 500, the image data entered into the image data entry unit 21 is displayed on the display unit 4. The manually written image is displayed intact on the writing screen 1a of the electronic board 1 in the position in which it was written.

Then, at step 501, it is determined whether a standard mode is set. The standard mode referred to herein is intended to mean a mode in which no reduced display region 1c is disposed on the writing screen 1a of the electronic board 1. When it is determined that the standard mode is set, the image data entered from the screen 1a of the electronic board 1 is stored in the image data storage unit 22 without causing the coordinates of the image data to be processed.

Figure 6:
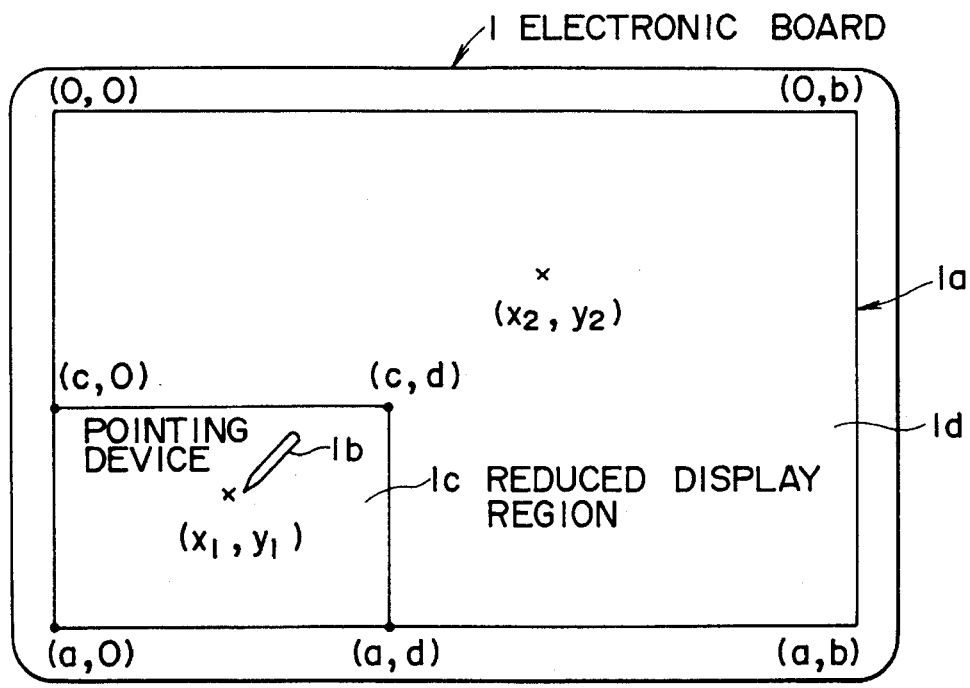
FIG. 6 is a schematic representation showing a process for converting a data item entered in the reduced display region of the writing screen of the electronic board into a standard coordinate on the non-reduced display region thereof.

On the other hand, when a mode other than the standard mode is set, which is provided with the reduced display region 1c, it is determined at step 502 whether the entered image data exists in a squared region of the reduced display region 1c, as shown in FIG. 6, enclosed by the starting point (c, 0) and the ending point (a, d). When the determination gives the result that the image data exists in the reduced display region 1c, that is, when it is decided that the pointing device 1b was operated in the reduced display region 1c, then it is decided that the input coordinates are to be corrected. Then, the program flow goes to step 503, at which the linear form of the coordinates of the input image data is converted on the basis of the formulas (1) and (2) as follows:

Formula (1):

$$x_2 = [a/(a-c)](x_1-c)$$

Formula (2):

$$y_2 = (b/d)y_1$$

where $x_1$ and $y_1$ may be the x- and y- coordinates of the point written in the reduced display region 1c of FIG. 6 with the pointing device 1b; and $x_2$ and $y_2$ may be the standard x- and y-coordinates of the point converted by the formulas (1) and (2) above and transferred into the non-reduced display region 1d of the screen 1a of the electric board 1.

For instance, when it is decided that the coordinates $(x_1, y_1)$ of the point written with the pointing device 1b in the reduced display region 1c of the writing screen 1a of the electronic board as shown in FIG. 6, the coordinates are converted into the standard coordinates $(x_2, y_2)$ in the non-reduced display region 1d thereof through the formulas (1) and (2) above.

To the contrary, when it is determined at step 502 that the entered image data does not exist in the squared region as defined and delimited hereinabove, that is, when it is decided that the pointing device 1b is operated in the non-reduced display region 1d on the screen 1a of the electronic board 1, the coordinates of the entered image data are stored intact in the image data storage unit 22. Hence, the image data storage unit 22 can always store the image data in the coordinate system of the non-reduced display region.

Figure 7:
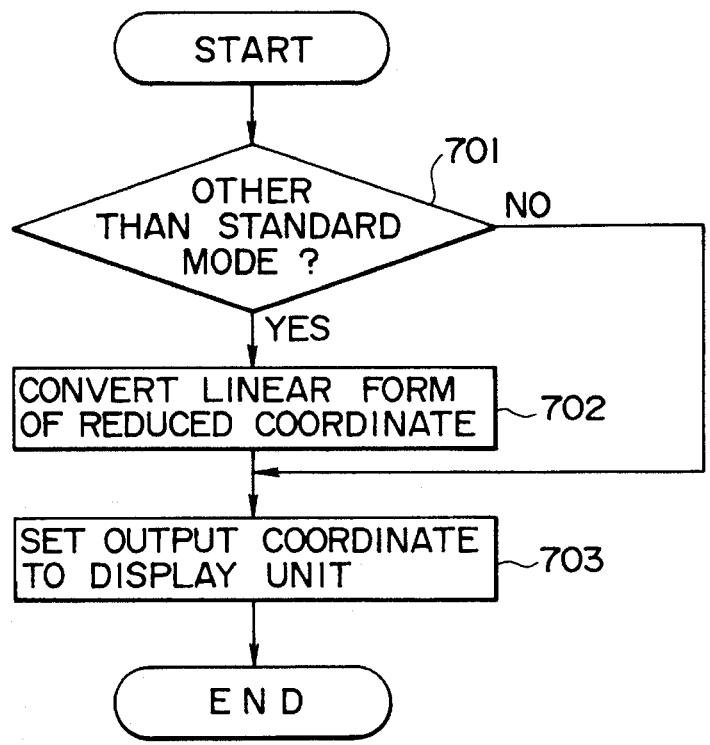
FIG. 7 is a flowchart showing details of a procedure for processing a display of recognized data.

A detailed description will now be made of the procedures of the recognized data display processing at step 306 in accordance with the flowchart as shown in FIG. 7.

First, at step 701, it is determined whether a standard mode is set which displays image data on a screen 1a having no reduced display region 1c. When the result of decision indicates that the standard mode is set, on the one hand, then the program flow goes to step 703, at which the coordinates of the logical data stored in the data storage 3 are converted into display signals without processing and are displayed on the display unit 4.

Figure 8:
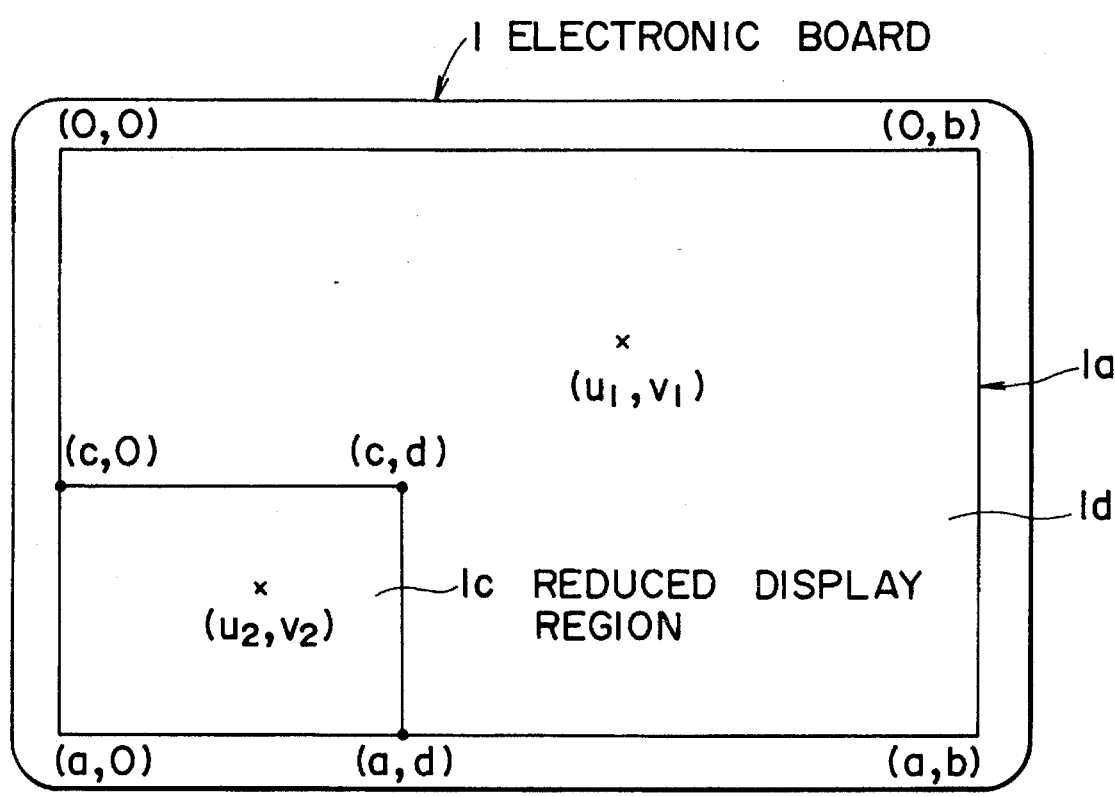
FIG. 8 is a schematic representation showing a process for converting a standard coordinate data item located on the non-reduced display region of the electronic board into a coordinate in the reduced display region thereof.

On the other hand, when it is determined at step 701 that a mode is set having the reduced display region 1c, other than the standard mode, it is necessary to display the image in a reduced size and shape on the reduced display region 1c. Hence, in this case, it is determined whether the logical data stored in the data storage 3 exists in the reduced display region 1c, as shown in FIG. 8, enclosed by the starting point (c, 0) and the ending point (a, d). When the decision at step 701 gives the result that the logical data does not exist in the defined region, it is necessary to correct the coordinates of the logical data so that the program flow goes to step 702, at which the linear form of the coordinates of the logical data is converted on the basis of formulas (3) and (4) as follows:

Formula (3):

$$v_2 = [(a-c)/a]u_1 + c$$

Formula (4):

$$v_2 = (d/b)v_1$$

where $u_1$ and $v_1$ may be the x- and y- coordinates of the point written in the non-reduced display region 1d of FIG. 8 with the pointing device 1b; and $u_2$ and $v_2$ may be the standard x- and y- coordinates of the point converted by formulas (3) and (4) above and transferred into the reduced display region 1c of the screen 1a of the electric board 1.

For instance, when it is decided that the coordinates $(u_1, v_1)$ of the point written with the pointing device 1b in the non-reduced display region 1d of the writing screen 1a of the electronic board 1 as shown in FIG. 8, the coordinates are converted into the standard coordinates $(u_2, v_2)$ in the reduced display region 1c thereof through the formulas (3) and (4) above.

On the other hand, when it is determined at step 702 that the logical data exists in the reduced display region 1c as defined and delimited hereinabove, the coordinates of the logical data are generated intact into the display unit 4.

It should be noted herein that, when the location of the reduced display region 1c and the non-reduced display region 1d on the writing screen 1a of the electronic board 1 differ from those as shown in FIGS. 6 and 8, the formulas for converting the linear forms of the image data and the logical data should be changed in accordance with the positions of the original points and the direction of their coordinates; and that the size, number and position of the reduced display region 1c may be set in an optional manner.

Figure 9A:
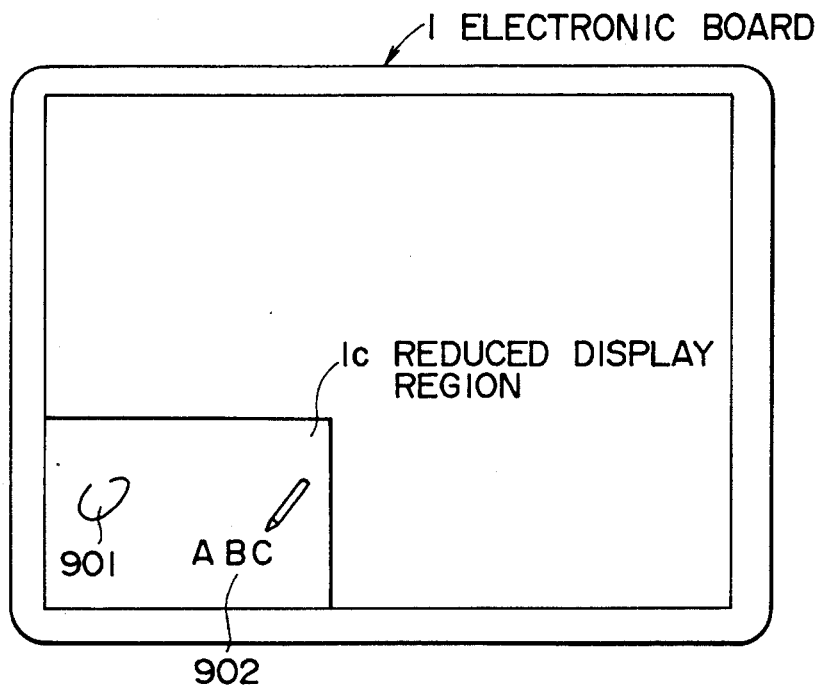
FIGS. 9(a) and 9(b) are each a schematic representation showing an example in which input data is recognized.
Figure 9B:
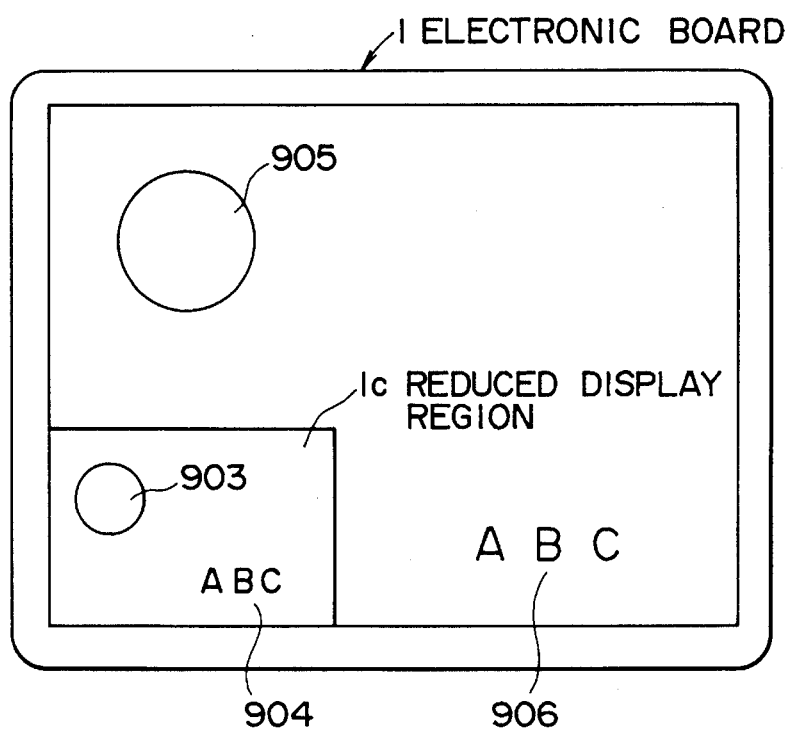

A description will now be made of an example in which a circle, as indicated by reference numeral 901, and characters "ABC", as indicated by reference numeral 902, are written manually with the pointing device 1b in the reduced display region 1c on the writing screen 1a of the electronic board 1 having an overlap-type display function as shown in FIG. 9(a). FIG. 9(b) shows an example in which the results obtained by processing the description contents as shown in FIG. 9(a) are displayed on the electronic board 1, that is, in which a circle 903 representing the result of recognition of the manually written circle 901 and a line of characters 904, as indicated by "ABC", representing the result of recognition of the manually written line of characters "ABC" 902, are displayed in the reduced display region 1c. Further, a recognized circle 905 and line of characters "ABC" 906 are displayed in the entire portion of the writing screen 1a of the electronic board 1.

Figure 10A:
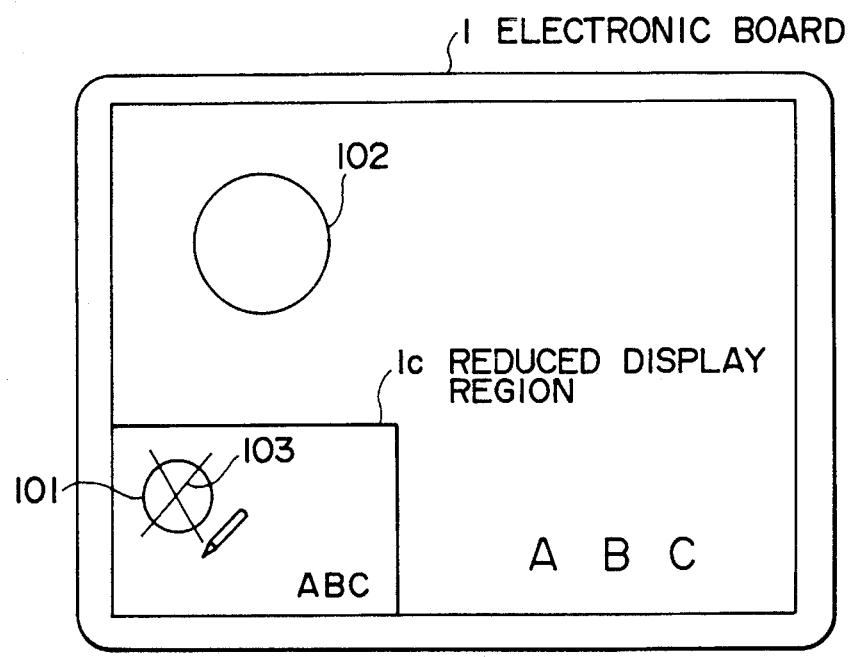
FIGS. 10(a) and 10(b) are each a schematic representation showing an example in which a DELETE command is executed.
Figure 10B:
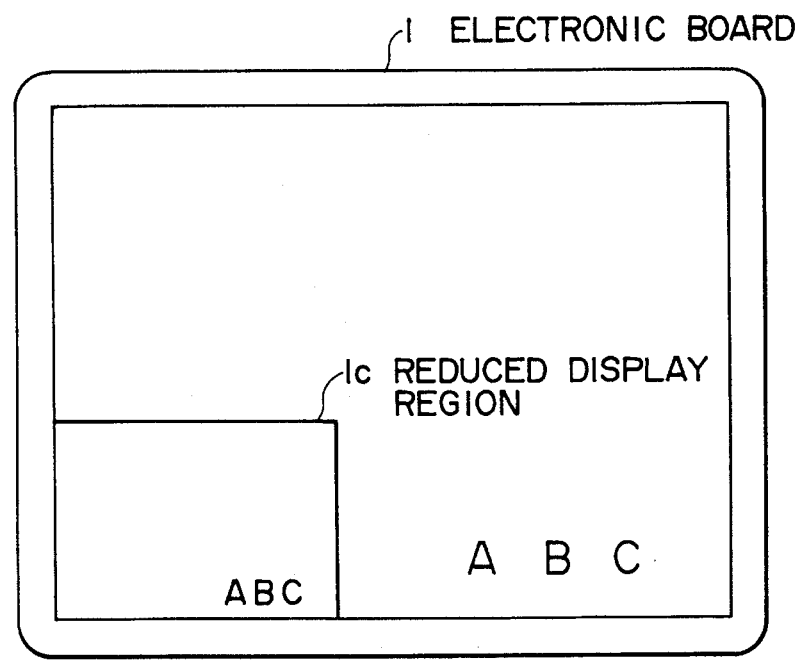

FIGS. 10(a) and 10(b) show an example of a display in which edit processing is executed with the edit command. FIG. 10(a) indicates an example of deleting circles 101 and 102 from the screen 1a of the electronic board 1 by using DELETE command 103, as indicated by symbol "x", in the reduced display region 1c. FIG. 10(b) indicates the result of executing the DELETE command 103 so that the circles 101 and 102 have been deleted from the screen 1a of the electronic board 1 as shown in FIG. 10(a), although the line of characters "ABC" remains stored and displayed on the writing screen 1a of the electronic board 1.

Figure 12A:
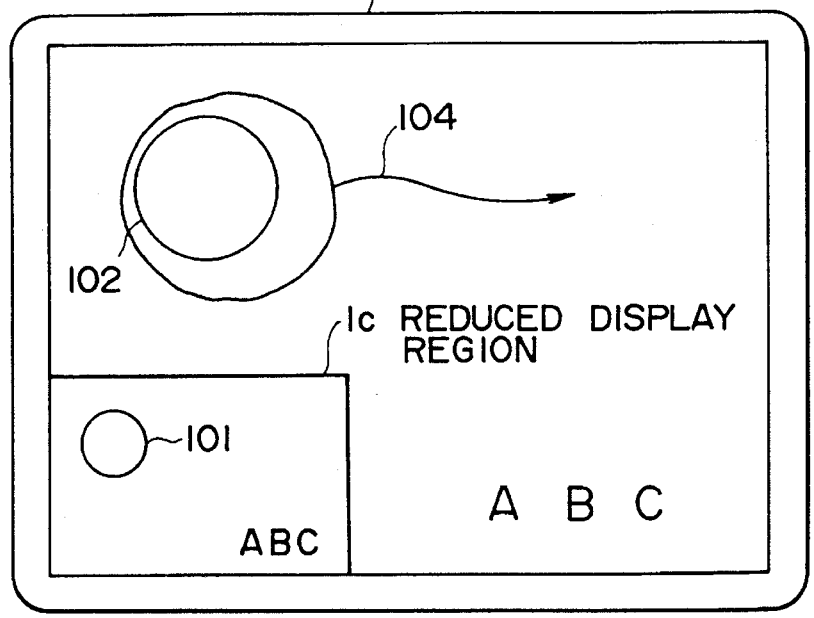
FIGS. 12(a) and 12(b) are each a schematic representation showing an example in which a MOVE command is executed.
Figure 12B:
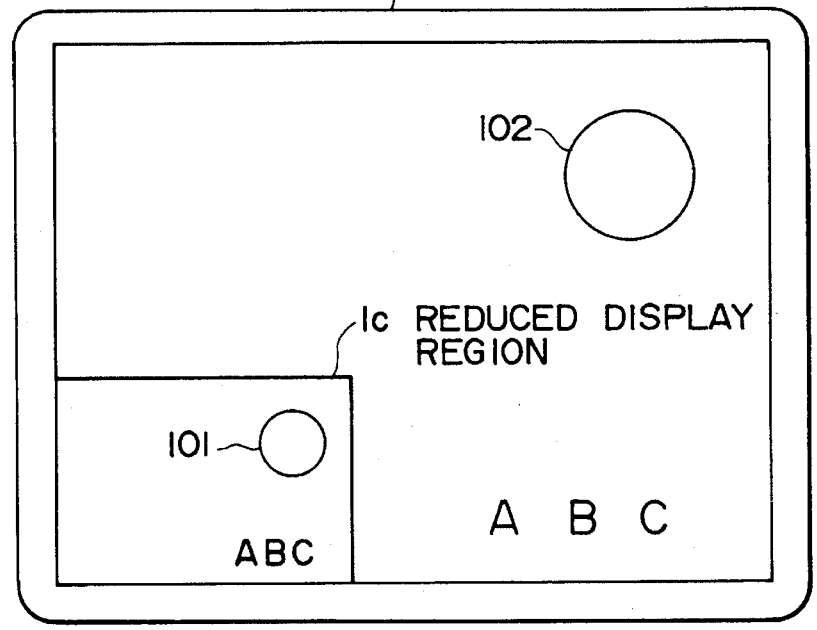

FIG. 11 shows an example of the table containing the edit commands, such as deleting, moving, copying, and retrieving. A description will now be made of an example of moving the circle 102 to a predetermined position on the writing screen 1a of the electronic board 1, with reference to FIGS. 12(a) and 12(b), by using the MOVE command as shown in FIG. 11. In this case, the circle 102 is enclosed as shown in FIG. 12(a) with a circular mark of the graphical representation of the MOVE command as shown in FIG. 11 and the position to which the circle 102 is intended to be moved is specified by an arrow mark of the graphical MOVE command. As a result, the circle 102 is transferred to the destination and displayed on the screen 1a of the electronic board 1 in the position specified by the MOVE command, as shown in FIG. 12(b). Likewise, the circle 101 displayed in the reduced display region 1c is transferred to and displayed in the reduced display region 1c in the position corresponding to the destination of the circle 102 on the screen of the electronic board 1 as shown in FIG. 12(b).

The electronic board system according to the embodiment of the present invention as described hereinabove can recognize characters, graphics, edit commands, and so on, manually written on the writing screen 1a of the electronic board 1 through the image data recognition unit 23, and then edit the characters, graphics, and so on on the basis of the recognized edit command. It can also project and display the characters, graphics, and the like on the screen 1a thereof while they are projected and displayed in their reduced sizes and shapes on the reduced display region 1c disposed at the lower portion of the screen 1a thereof. Hence, an operator who cannot reach the upper portion of the screen 1a can operate the electronic board 1 in a complex and precise fashion through the reduced display region 1c disposed at the lower portion of the screen 1a of the electronic board 1, thereby taking advantage of the large size and high resolution of the electronic board 1 to a sufficient extent. Further, as the operations can be made through either of the reduced display region 1c or the non-reduced display region 1d, the writer does not shadow the non-reduced display region 1d when the writer operates this system through the reduced display region 1c, thereby allowing the audience to see the display contents without interference from the writer.

In addition, the sensors are embedded in the back of the writing screen 1a of the electronic board 1 so that the electronic board system can be transferred to a different place without difficulty, and can be prepared at relatively low cost.

Furthermore, operations such as deleting can be performed in accordance with the edit commands without the use of any special device for performing the operations, so that operability of the electronic board system can be improved to a great extent.

When the characters, graphics, and so on are displayed in black and white, the edit processing can be performed with only one kind of pointing device 1b.

Further, touch sensors or optical sensors may be employed as the sensors for the electronic board 1, which are embedded in the back of the writing screen of the electronic board.

In addition, one data processor 2 is disposed to correspond to one screen of the electronic board 1 in this embodiment of the electronic board system according to the present invention. The electronic board system, however, may be arranged such that only one data processor 2 corresponds to a plurality of writing screens of the electronic boards. In this case, the plural electronic boards 1 are disposed in a row.

Figure 13:
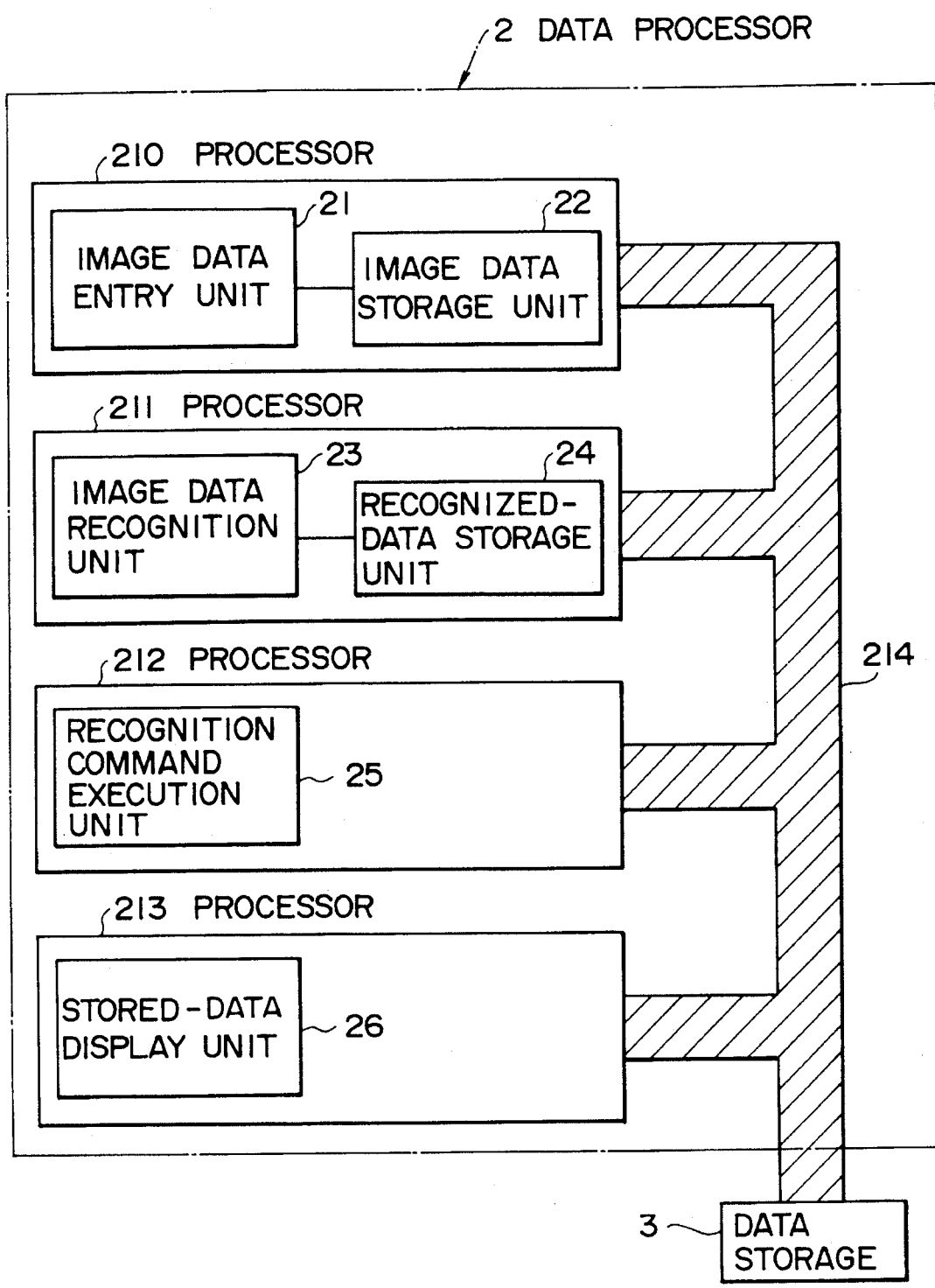
FIG. 13 is a block diagram showing a second embodiment of the electronic board system according to the present invention.

Next, a description will be made of an electronic board system according to a second embodiment of the present invention as shown in FIG. 13, which is provided with a data processor 2 having a plurality of processors 210 to 213. The processor 210 comprises an image data entry unit 21 and an image data storage unit 22; the processor 211 comprises an image data recognition unit 23 and a recognized-data storage unit 24; the processor 212 comprises a recognition command execution unit 25; and the processor 213 comprises a stored data display unit 26. Each of the processors 210 to 213 is connected with each other and a data storage 3 through a data transmission line 214. It should be noted herein, however, that each of the units may be allocated to any processor as needed, and that the processors and/or the units may be connected in any combination as needed. The combination of the units as shown in the illustration of the second embodiment of the electronic board system according to the present invention can operatively manipulate data in the manner as described hereinabove.

Figure 14:
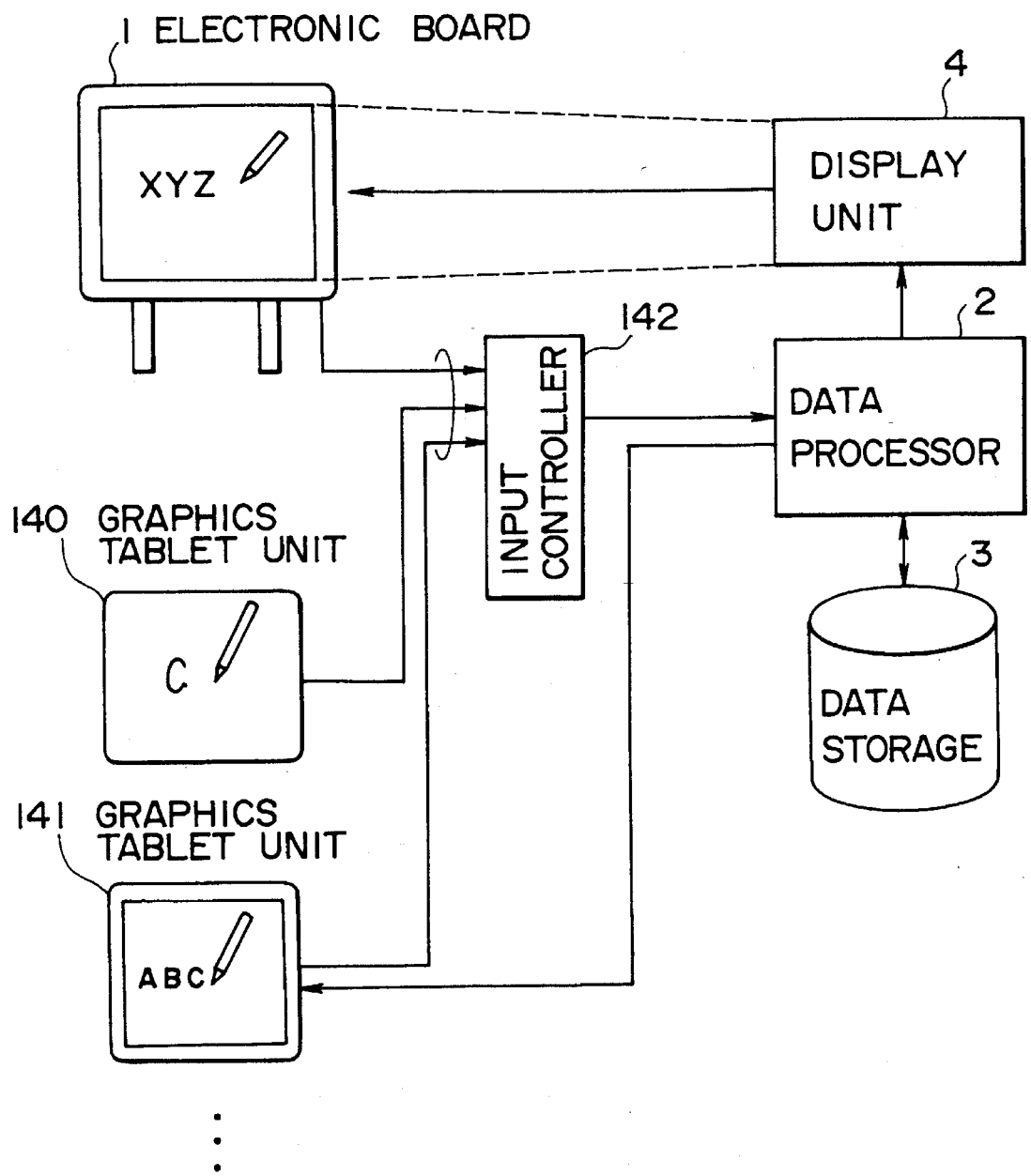
FIG. 14 is a block diagram showing a third embodiment of the electronic board system according to the present invention, in which a plurality of graphics tablet units are connected.

FIG. 14 shows a third embodiment of an electronic board system according to the present invention, in which a plurality of graphics tablet units 140 and 141 are connected to a data processor 2, in addition to the electronic board 1. In the electronic board system of this embodiment, the electronic board 1 and the plural graphics tablet units 140 and 141 are connected with an input controller 142 that in turn is connected with the data processor 2. The data processor 2 may be configured in such a manner as the data processor 2 used for the electronic board system of the first embodiment according to the present invention. The input controller 142 is adapted to select either of the electronic board 1 or one of the tablet units 140, 141, and the image data generated from the selected device is stored in the image data storage unit 22 of the data processor 2. The image data entered from the tablet units 140 and 141 is subjected to the recognition processing in the manner as in the first embodiment, thereby displaying the entered image data on the screen 1a of the electronic board 1.

The graphics tablet units 140 and 141 may be arranged in such a manner that one of the tablet units enters image data written manually, and the other is adapted to be capable of displaying the manually written image data. The arrangement of the tablet units allows the results of execution by the data processor 2 to be displayed on both of the electronic board 1 and the tablet unit having a display function.

When the graphics tablet units 140 and 141 of such arrangement are placed nearby each of the attendants at a meeting, each of the attendants can take part in the meeting with the person using the electronic board 1 and the other attendants by amending what is written on the writing screen of the electronic board 1 and what is amended by the other attendants. This electronic board system can thus greatly facilitate participation in the meeting.

Figure 15:
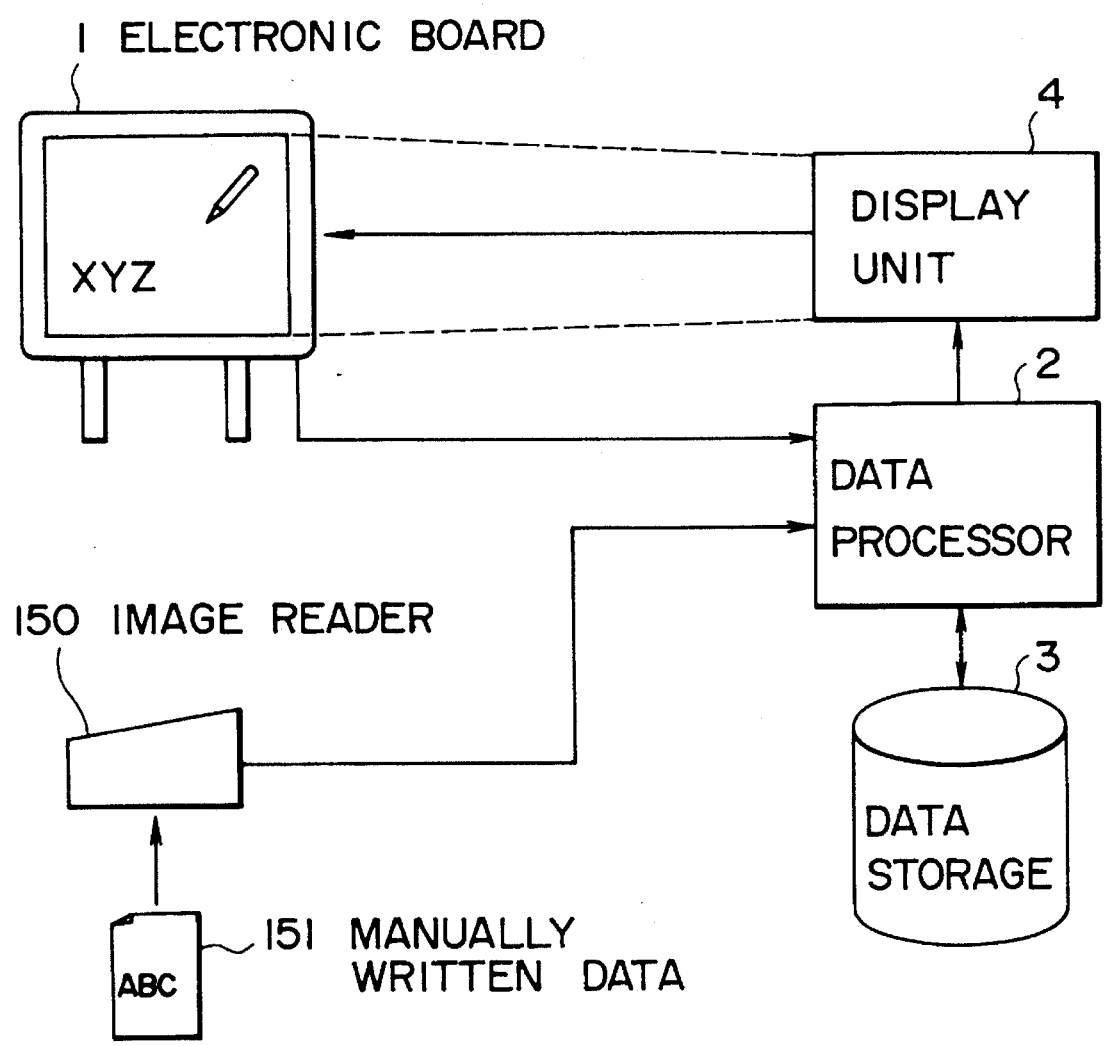
FIG. 15 is a block diagram showing a fourth embodiment of the electronic board system according to the present invention, in which an image reader such as a scanner or a facsimile machine is connected.

FIG. 15 illustrates an electronic board system of a fourth embodiment according to the present invention, in which an image reader such as an image scanner or a facsimile machine is connected with a data processor 2 with which the electronic board 1 in turn is connected. With the electronic board system according to the fourth embodiment of the present invention, an image reader 150 can read data 151, such as characters, graphics, pictures or the like, written or drawn manually with a writing device such as a pencil or a ball point pen, and transmit the read image data to a data processor 2 that processes the image data. The results of recognition of the image data to be made by the data processor 2 are then displayed on the screen of the electronic board 1.

The arrangement of the electronic board 1 connected with the image reader 150 can allow each of the attendants at a meeting to add an amendment to a draft memorandum, for example, for the meeting, displayed on the screen of the electronic board 1 through the image reader 150. Hence, this arrangement can facilitate the meeting to a great extent.

Figure 16:
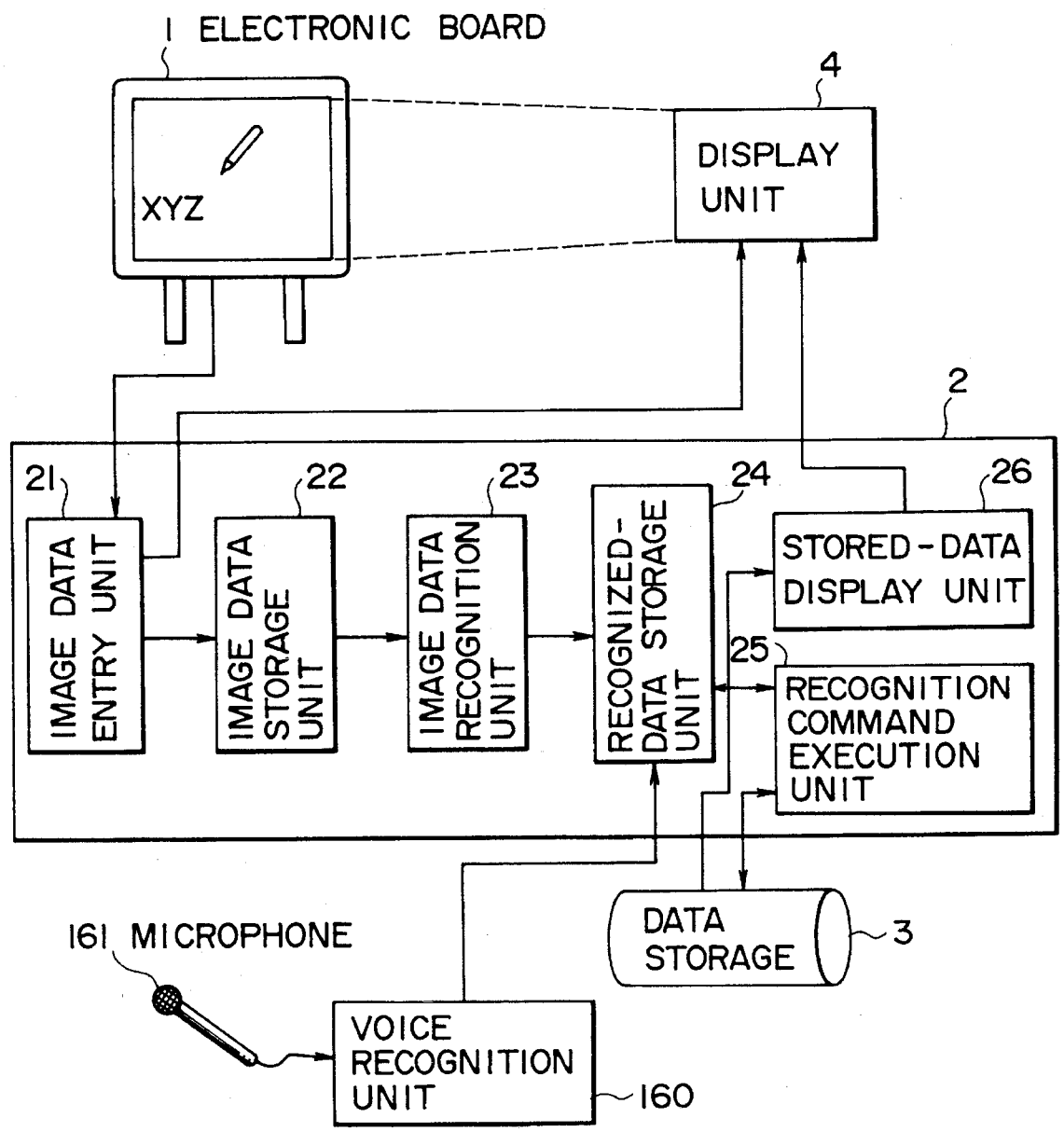
FIG. 16 is a block diagram showing a fifth embodiment of the electronic board system according to the present invention, in which a voice recognition device is connected.

Furthermore, a description will be made of a fifth embodiment of an electronic board system according to the present invention, in which a voice recognition device or a speech recognition device is connected with a data processor 2. The data processor 2 may comprise an image data entry unit 21, an image data storage unit 22, an image data recognition unit 23, a recognized-data storage unit 24, a recognition command execution unit 25, and a stored-data display unit 26, and each of these units may have substantially the same functions as those provided for the electronic board system according to the first embodiment of the present invention. With this arrangement of the electronic board system as shown in FIG. 16, voices are entered into a voice recognition unit 160 through a microphone 161. The voice recognition unit 160 is arranged to recognize the correspondence of the input voices to words, graphics, edit commands, or the like and to transmit the results of recognition to the recognized-data storage unit 24 of the data processor 2 for storing. When the edit commands are contained in the results of recognition, the edit commands are executed by the recognition command execution unit 25 of the data processor 2 to thereby display the result of execution on the screen of the electronic board 1.

When the image data input means, such as the graphics tablet unit or the image reader, is connected with the plural data processors 2, in addition to the electronic board 1, as shown in FIGS. 14 to 16, each of the data processors 2 may be arranged so as to manage each of the input devices on the basis of an input device management table 170 as shown in FIG. 17.

The input device management table 170 contains data, such as the device identification numbers for the input devices, the kinds of the devices, the addresses indicating the connection of the input devices with the processors, the status indicative of the current states of the input devices, the display modes indicative of the overlap display type, the tiled display type and the standard display type, and the starting positions and the ending positions of the reduced display region.

Figure 18:
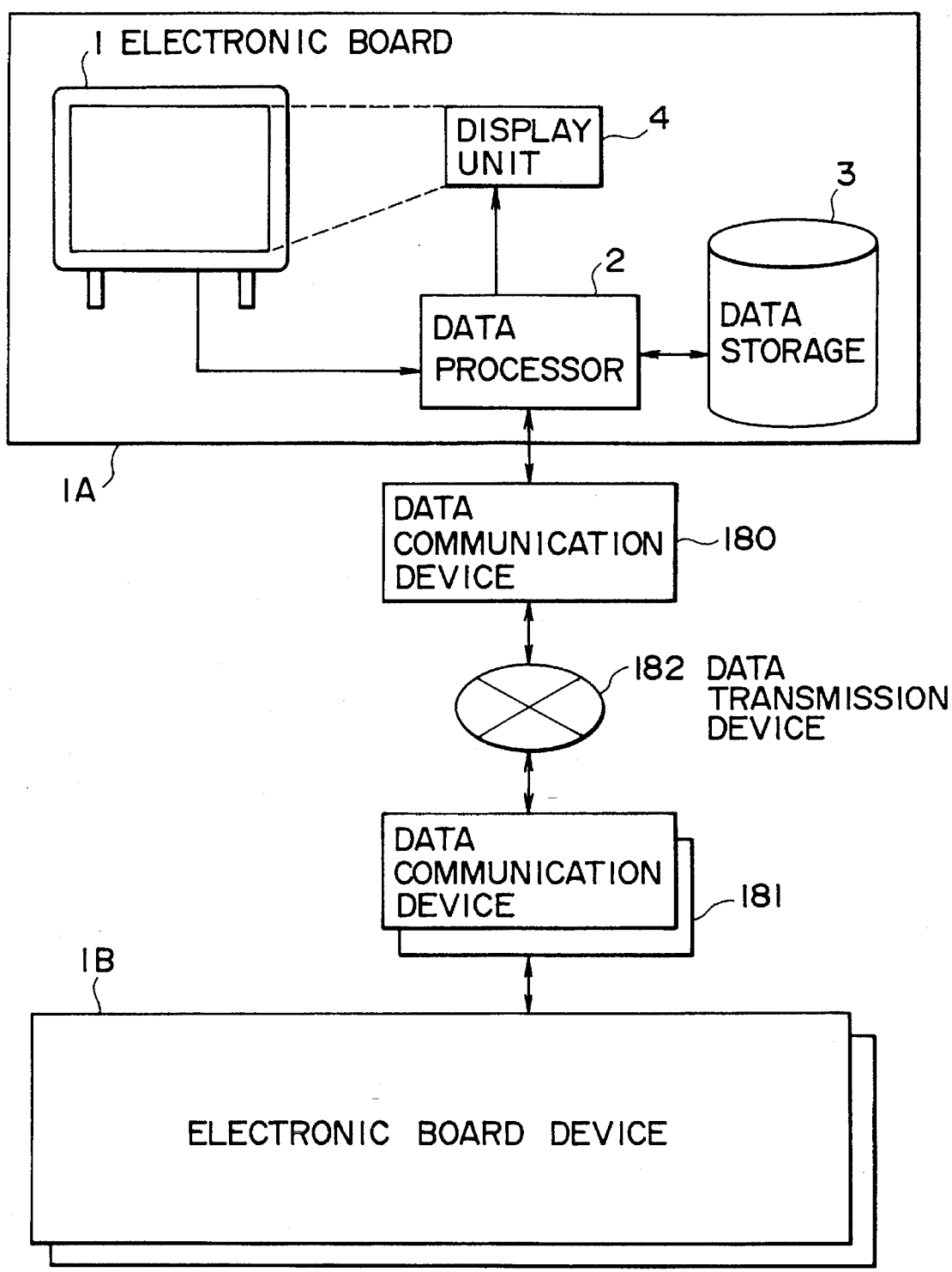
FIG. 18 is a block diagram showing a sixth embodiment of the electronic board system according to the present invention, in which a plurality of electronic boards are connected with each other through data communication devices.

FIG. 18 shows a sixth embodiment of an electronic board system according to the present invention, in which a plurality of electronic board systems are connected with each other through a plurality of data communication devices. As shown in FIG. 18, for example, an electronic board system 1A having the same configuration as the system shown in FIG. 1 is connected through a data communication device 180 with a data transmission device 182, serving as a local area network or a global area network, with which an electronic board system 1B having the same configuration as shown in FIG. 1 is connected through another data communication device 181. The image data can be exchanged between the electronic board systems 1A and 1B disposed at remote locations so that a meeting can be held while exchanging the image written on the screen of the electronic board 1 between or among the electronic board systems disposed at remote locations.

Figure 19:
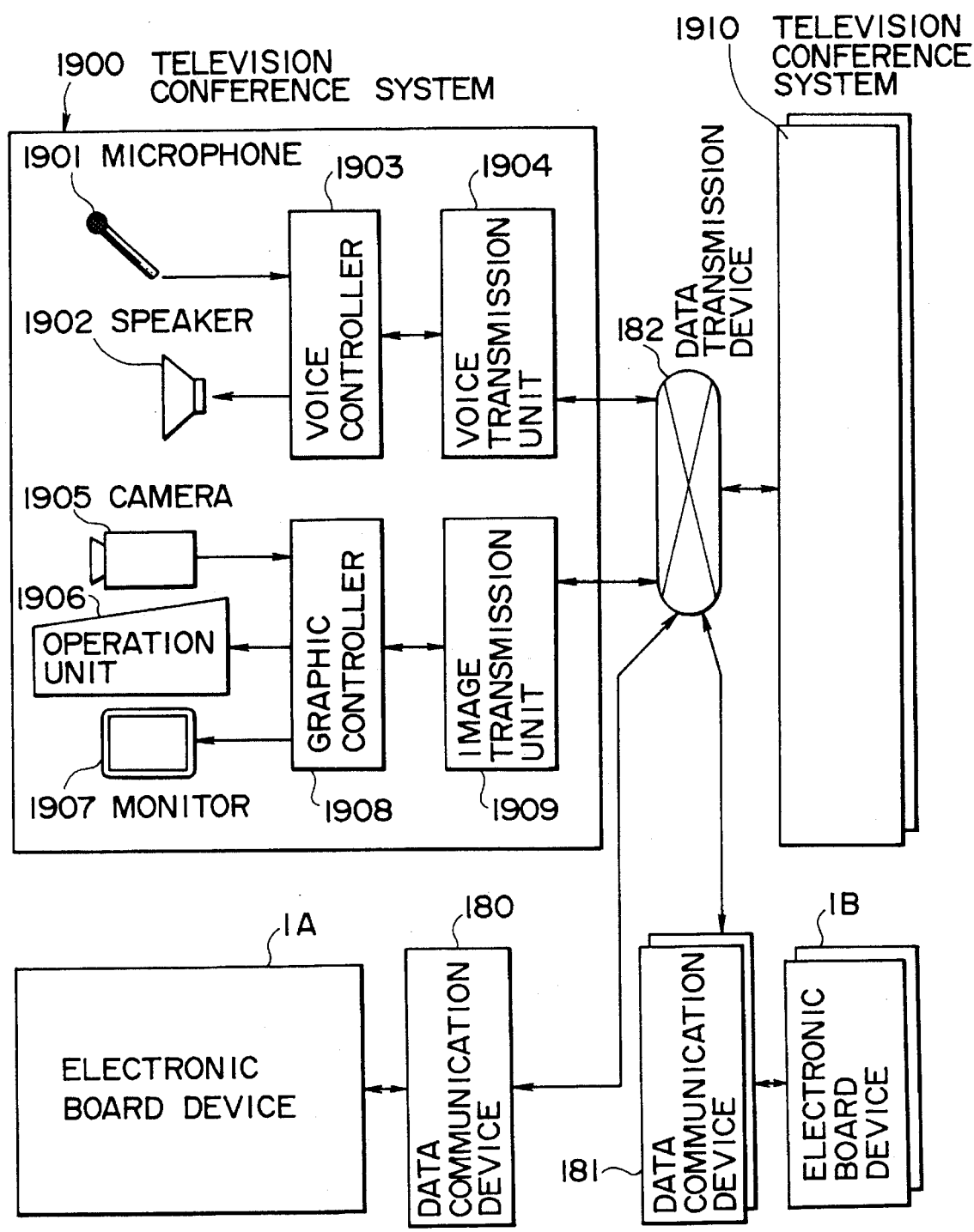
FIG. 19 is a block diagram showing a seventh embodiment of the electronic board system according to the present invention, in which the electronic board is connected with a television conference system, that is, a system to make a conference with persons at remote locations through the television conference system.

FIG. 19 shows a seventh embodiment of an electronic board system according to the present invention, in which the electronic board system is connected with a television conference system. As shown in FIG. 19, for example, a television conference system 1900 comprises a microphone 1901, a speaker 1902, a voice controller 1903, a voice transmission unit 1904, a camera 1905, an operation unit 1906, a monitor 1907, a graphics controller 1908, and an image transmission unit 1909. The television conference system 1900 may be connected with another television conference system 1910 disposed at a different location via the data transmission unit 182 with which the interactive electronic board systems 1A and 1B shown in FIG. 18, each having a recognition function, are connected through the data communication devices 180 and 181, respectively. The arrangement of the electronic board systems and the television conference systems allows the data written on the screen of the electronic board 1 to be exchanged at remote locations during a meeting through a television set.

As has been described hereinabove, the electronic board system according to the present invention comprises a pointing device, plural sensors for detecting the traces of an image written on the screen with the pointing device, which are embedded in the rear of the screen; first storage means for storing the traces of the image detected by the sensors as image data consisting of a sequence of coordinate data; recognition means for recognizing the image written on the screen on the basis of the image data stored in the first storage means, and at the same time for recognizing whether the image data relating to the particular traces corresponds to either one of a plurality of the predetermined edit commands; second storage means for storing the recognized image or the recognized edit command; command execution means for editing the recognized image in accordance with the edit command stored in the second storage means; and projection and display means for projecting and displaying the edited image onto the writing screen of the electronic board, and at the same time for projecting and displaying the edited image in reduced form on a region disposed at the lower portion of the screen of the electronic board. Hence, the electronic board system according to the present invention is adapted to recognize the image and the edit command to be represented in the reduced display region of the screen of the electronic board and in the non-reduced display region thereof, and to update the display content to be displayed one after another on the screen of the electronic board. Further, the electronic board system according to the present invention allows a person who cannot reach the upper portion of the screen of the electronic board to perform complex and precise operations through the reduced display region located at the lower portion of the screen of the electronic board, thereby taking advantage of the large size and high resolution of the electronic board.

In addition, the electronic board system according to the present invention can be operated through either one of the non-reduced display region or the reduced display region. Hence, when the electronic board system is operated through the reduced display region, the person writing the image on the reduced display region does not shadow the non-reduced display region, so that the audience can see the image to a full extent through the non-reduced display region without interference from the writer.

Further, sensors are embedded in the rear of the screen of the electronic board so that the electronic board system can be moved or transferred without difficulty, and the electronic board system can be prepared at reasonably low cost.

Furthermore, the electronic board system according to the present invention allows the various operations to be performed through the edit commands (for example deleting operations to be performed on the basis of a delete command), so that a special operating device such as a deleting device is not required, thereby improving operability.

The electronic board system according to the present invention can recognize the image data written on the screen of the electronic board as logical data having a business meaning to the user or as a command for the logical data, and it can perform a variety of operations, such as inserting, deleting, changing, printing, inspecting, transferring, saving, copying, and distributing, for example, to thereby display the results obtained by the various processes in real time on the writing screen of the electronic board. Hence, the electronic board system can further present the advantages, among others, that the time of the meeting can be reduced, the quality of the meeting results can be improved, and expenses required for the meeting to be held with persons located at remote locations, such as traveling expenses and so on, can be reduced.

In addition, the electronic board system according to the present invention allows the recognition processing to be changed in accordance with the business of each of the users so that the scope of application of the electronic board system can be expanded.

Furthermore, the electronic board system according to the present invention can improve the efficiency of meetings to be held between or among remote locations and reduce expenses required for the meetings by connecting the plurality of the electronic boards with the data transmission device or the television conference systems. Further, the data processor for the electronic board system according to the present invention having the recognition processing function loaded thereon can be connected with an electronic board and/or a display unit of a conventional type, thereby readily realizing a system that is low in cost, high in quality, and easy to move or carry.

What is claimed is:

1. An electronic board system, comprising:

a pointing device;

a plurality of sensors for detecting information written with said pointing device on a writing screen of an electronic board, said sensors being embedded in the back of the writing screen;

first storage means for storing the information detected by said sensors as image data consisting of a sequence of coordinate data;

recognition means for recognizing the information written on the writing screen on the basis of the image data stored in said first storage means, and for recognizing whether the image data relating to particular information thereof corresponds to any of a plurality of preset edit commands;

second storage means for storing the recognized information;

command execution means for editing the recognized information on the basis of an edit command stored in said second storage means; and projection and display means for projecting and displaying the edited information in a non-reduced form at a non-reduced display region of the writing screen of the electronic board, and for projecting and displaying the edited information in a reduced form at a reduced display region of the writing screen of the electronic board;

wherein the sensors are disposed in the reduced display region of the writing screen of the electronic board and in the non-reduced display region thereof; and wherein the Sensors are disposed in the reduced display region at a density higher than in the non-reduced display region.

2. An electronic board system as claimed in claim 1, wherein the reduced display region having the higher density of sensors is entirely disposed below a midpoint of the writing screen height.

3. An electronic board system as claimed in claim 2, wherein the reduced display region is further entirely disposed to one side of a midpoint of the writing screen width.

4. An electronic board system as claimed in claim 1, wherein the recognition means recognizes information originating from both of the non-reduced display region and the reduced display region.

* * * * *